(12) United States Patent
Corey

(10) Patent No.: US 7,559,845 B2
(45) Date of Patent: Jul. 14, 2009

(54) NESTED DISC PACK COUPLING

(75) Inventor: Dennis J. Corey, Youngsville, PA (US)

(73) Assignee: Rexnord Industries, LLC, Milwaukee, WI (US)

( * ) Notice: Subject to any disclaimer, the term of this patent is extended or adjusted under 35 U.S.C. 154(b) by 373 days.

(21) Appl. No.: 11/245,881

(22) Filed: Oct. 7, 2005

(65) Prior Publication Data
US 2007/0082744 A1   Apr. 12, 2007

(51) Int. Cl.
*F16D 3/00*   (2006.01)
(52) U.S. Cl. .......................................... 464/98; 464/99
(58) Field of Classification Search .................. 464/98, 464/99
See application file for complete search history.

(56) References Cited

U.S. PATENT DOCUMENTS

| | | | |
|---|---|---|---|
| 3,654,775 A | 4/1972 | Williams |
| 3,727,431 A | 4/1973 | Yokel |
| 4,240,763 A | 12/1980 | Moore |
| 4,353,704 A | 10/1982 | Corey |
| 4,416,645 A | 11/1983 | Fredericks |
| 4,560,364 A | 12/1985 | Cohen |
| 4,708,692 A | 11/1987 | Weiss |
| 4,741,722 A | 5/1988 | Federn |
| 5,588,917 A | 12/1996 | D'Ercole |
| 5,725,430 A | 3/1998 | Barickman et al. |
| 5,795,231 A | 8/1998 | Fukuda |
| 6,471,594 B2 | 10/2002 | Scheithauer et al. |
| 6,685,570 B2 | 2/2004 | Zilberman et al. |

FOREIGN PATENT DOCUMENTS

| | | |
|---|---|---|
| EP | 0 191 552 A2 | 8/1986 |
| JP | 03 209024 A | 9/1991 |
| JP | 07 279988 A | 10/1995 |

OTHER PUBLICATIONS

Rex Chainbelt Dwg. No. 16266 (Apr. 30, 1970).
Rexnord Dwg. No. 64981 (Jun. 15, 2004).
Lovejoy/Jaure, Drop in (API) Style 5-Piece Disc Coupling, 6-bolt Catalog Cut.
Autogard, Autoflex Series ECS HVII, Catalog Cut.
TB Woods, Spacer—BF Series 6 Bolt Drop Out Spacer Coupling, Catalog Cut.
Kop-flex, KD Disc Couplings.
The Falk Corporation, Type FDG31AA, LL, & AL, Catalog Cut (2002).
262_SN-X Coupling.
Kop-flex, High Performance Flexible Disc Couplings, Bulletin HP 103 (1989).
International Search Report dated Apr. 17, 2007.

*Primary Examiner*—Victor MacArthur
(74) *Attorney, Agent, or Firm*—Quarles & Brady LLP

(57) ABSTRACT

A disc pack coupling for transmitting torque between two shafts approximately aligned on a shaft axis a hub assembly including an end adapter adjacent to a hub flange. A center member is fixed to the end adapter and is encircled by a disc pack. The disc pack resiliently couples the end adapter and the hub flange.

18 Claims, 2 Drawing Sheets

NESTED DISC PACK COUPLING

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

This invention relates to shaft couplings, and more particularly, to disc pack couplings for transmitting torque between two shafts approximately aligned on a shaft axis.

Flexible disc pack couplings, such as Thomas Flexible Disc Couplings sold by Rexnord Industries, Inc., Milwaukee, Wis., are known in the art for transmitting torque between adjacent generally axially aligned first and second shafts. These couplings include a disc pack interposed between a pair of hubs or formed part of hub assemblies including end adapters.

Each disc pack is typically formed from a plurality of stacked coaxial discs and either surrounds the hub outer cylindrical diameter directly adjacent to the coupling far end or is captured inside of specially machined additional components. This arrangement inhibits the ability of the hub to accept large shaft bore diameters and requires the use of low profile headed specialty fasteners and/or results in the necessity of providing more costly end adapters.

Alternatively, each disc pack is captured between large radially extending flanges forming part of the hub and end adapter. Each flange includes holes for a bolts which connect the flanges to the disc pack. The bolts connect the hub and end adapter in an alternating arrangement to the disc pack. This arrangement requires large diameter separate flanges to accommodate the bolt hole arrangement which mandates expensive components. Sandwiching the disc packs between the end adapter and hub hides the disc pack from view and requires disassembling the coupling to inspect the disc packs for wear. Moreover, upon the failure of both of the above described types of couplings, upon failure of the disc pack, the shafts can rotate uncontrollably causing damage to the rotating equipment connected to the shafts.

Nested disc pack couplings are especially suitable for use in applications where shaft coupling must be maintained upon failure of the disc pack. This is accomplished by providing hub assemblies including a hub having a non-circular perimeter loosely nested in a non-circular cavity formed in an end adapter fixed to the shaft end. The disc pack resiliently couples the hub to the end adapter. The hub assemblies of the coupling are joined by a center member that transmits torque between the hub assemblies. Upon failure of the disc pack, the hub engages the end adapter to allow an orderly shut down of the rotating shaft.

Unfortunately, in known nested couplings, inspection of the disc pack is difficult because the disc pack is shielded from view. As a result, the coupling must be disassembled to properly inspect the coupling. This is time consuming and expensive. Moreover in known nested couplings, the flexing disc pack can be physically restricted by physically contacting the hub or end adapter. Therefore, a need exist for an improved disc pack coupling.

SUMMARY OF THE INVENTION

The present invention provides a disc pack coupling for transmitting torque between two shafts approximately aligned on a shaft axis. The coupling includes a hub assembly including an end adapter adjacent to a hub flange. A center member is fixed to the end adapter and in one embodiment is encircled by a disc pack. The disc pack resiliently couples the end adapter and the hub flange. In another embodiment of the present invention, the disc pack is spaced from one of the end adapter and hub flange by at least two washers having different thicknesses.

A general objective of the present invention is to provide a disc pack coupling having an exposed disc pack. The objective is accomplished in one embodiment by providing a disc pack encircling the center element with one of the hub flange and the end adapter sandwiched between the disc pack and the other of the hub flange and the end adapter which exposes the disc pack for easy viewing for inspection.

Another objective of the present invention is to provide a space in which the disc pack can flex. This objective is accomplished in one embodiment by spacing the disc pack from one of the end adapter and hub flange by at least two washers having different thicknesses.

Another objective of the present invention is to provide a coupling that maintains control of the shafts upon failure of the disc pack. The objective is accomplished in one embodiment of the invention by nesting the hub flange and end adapter in an interfering relation, wherein upon failure of the disc pack the hub flange and end adapter engage to maintain shaft coupling.

The foregoing and other objects and advantages of the invention will appear from the following description. In the description, reference is made to the accompanying drawings which form a part hereof, and in which there is shown by way of illustration a preferred embodiment of the invention.

Figure 1:
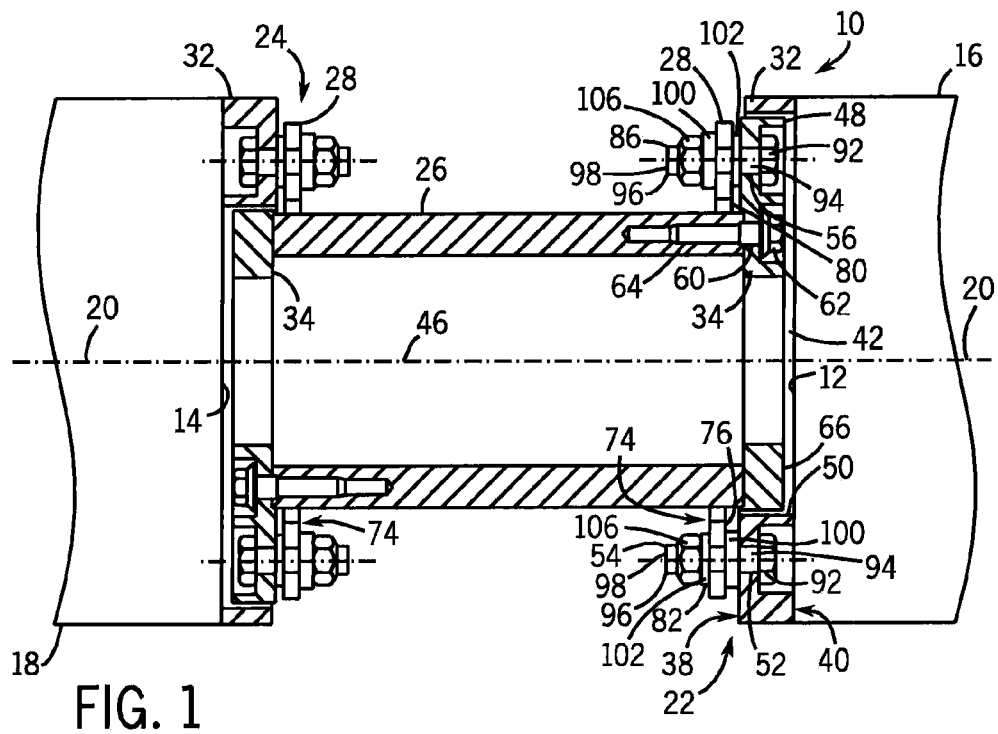
FIG. 1 is a sectional view of a coupling incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
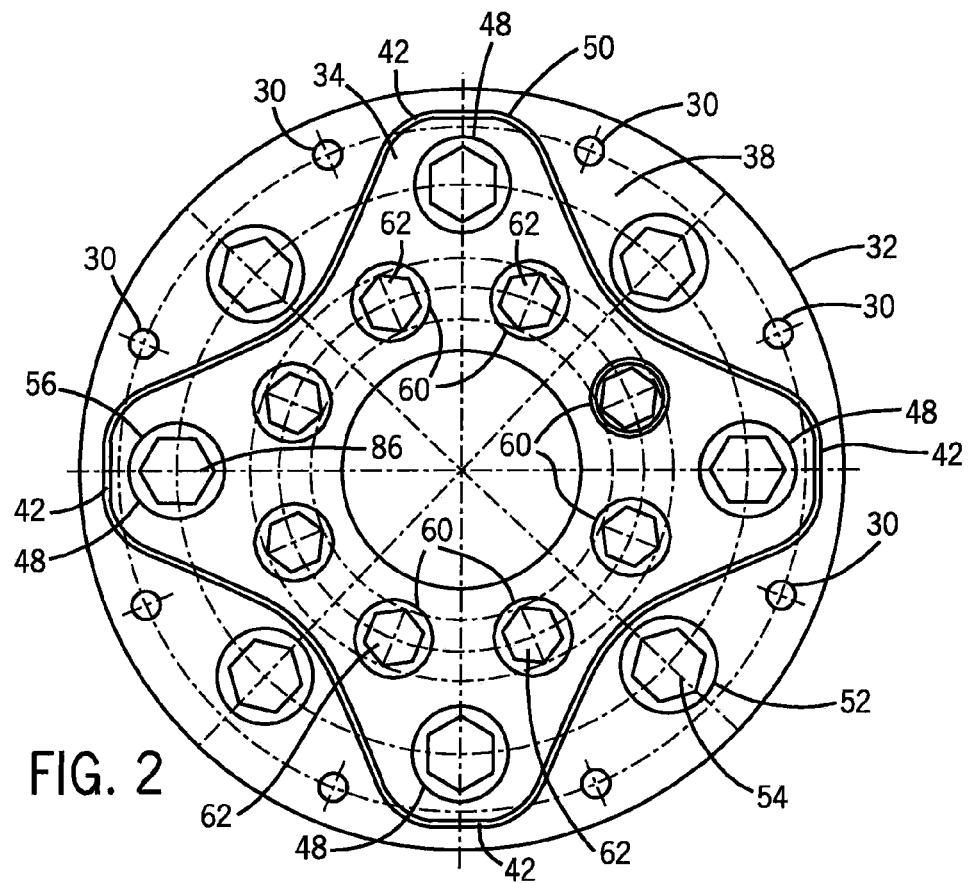
FIG. 2 is an end view of the hub assembly of the coupling of FIG. 1.

As shown in FIGS. 1 and 2, a nested disc pack coupling 10 incorporating the present invention couples spaced shaft ends 12, 14 for transmitting torque between two shafts 16, 18 approximately aligned on a shaft axis 20. The coupling 10 includes a hub assembly 22, 24 fixed to each shaft end 12, 14.

The hub assemblies 22, 24 are joined by a center member 26 that transmits torque between the hub assemblies 22, 24.

Each hub assembly 22, 24 is fixed to one of the shaft ends 12, 14, and transmits a torsional force between the respective shaft 16, 18 and the center member 26. The hub assemblies 22, 24 are substantially identical having a hub flange 32 resiliently coupled to an end adapter 34 by a disc pack 28. Accordingly, the hub flange 32, end adapter 34, and disc pack 28 of one hub assembly 22 will be described relative to one shaft 16 with the understanding, that the hub flange 32, end adapter 34, and disc pack 28 of the other hub assembly 24 is substantially the same relative to the other shaft 18.

The hub flange 32 is rotatable about a hub axis 46 substantially coaxial with the shaft axis 20, and is fixable to the shaft end 12. In a preferred embodiment, holes 30 extending axially through the hub flange 32 receive bolts or screws (not shown) that fix the hub flange 32 to the shaft end 12. Preferably, the holes 30 are evenly circumferentially spaced proximal the flange perimeter to simplify balancing the coupling 10. Of course, other methods for fixing the hub flange 32 to the shaft end 12 can be used, such as welding, and providing a hub, such as described below referencing FIG. 3, without departing from the scope of the invention. Preferably, the hub flange 32 is formed from machined metal castings, such as steel.

In the embodiment disclosed in FIGS. 1 and 2, the hub flange 32 extends radially from the hub axis 46 and defines an axially inwardly facing flange face 38 facing the other hub assembly 24 and an axially outwardly facing face 40 facing away from the other hub assembly 24. A cavity 50 coaxial with the hub axis 46 formed in the inwardly facing flange face 38 receives the end adapter 34 in a nesting relation. Advantageously, arranging the end adapter 34 and hub flange 32 in a nesting relation minimizes the weight and inertia of the coupling 10.

In a preferred embodiment, the cavity 50 defines a noncircular perimeter having radially extending lobes 42 which conform loosely to the perimeter of the end adapter 34. Although nesting the end adapter 34 in the hub flange 32 is described, the hub flange 32 can nest in the end adapter 34 without departing from the scope of the invention. Moreover, although arranging the end adapter 34 and hub flange 32 in a nesting relation is preferred, nesting the end adapter 34 and hub flange 32 is not required.

A plurality of circumferentially spaced axially extending hub holes 52 are formed through the hub flange 32 parallel to the hub axis 46 between the cavity lobes 42. The hub holes 52 extend between the hub flange faces 38, 40 and are preferably countersunk from the outwardly facing hub flange face 40 to allow socket access to a bolt 54 extending through the hub hole 52 to disassemble and assemble the hub assembly 22. The bolts 56 fix the disc pack 28 to the hub flange 32, as described below.

The end adapter 34 is loosely received in the cavity 50 and is substantially coaxial with the hub axis 46. Preferably, the end adapter 34 has a non-circular perimeter including ears 48 loosely received in the cavity lobes 42 in a rotational interfering relation. The ears 48 are loosely received in the lobes 42 to allow relative rotational motion of the end adapter 34 and hub flange 32 without engaging the ears 48 and lobes 42 when the disc pack 28 flex under normal conditions. Advantageously, upon failure of the disc pack 28, the ears 48 engage the lobes 42 to maintain torque transfer between the shafts 16, 18 via the coupling 10 for a controlled deceleration of the shaft rotation. Although a nested profile having four ears 48 received in four lobes 42 is shown, the nested profile can have any non-circular shape which provides a rotational interfering relation between the end adapter 34 and hub flange 32, such as oblong, triangular, star-shaped, elliptical, clover, and the like, without departing from the scope of the invention.

A plurality of circumferentially spaced axially extending end adapter holes 56 are formed through the end adapter ears 48 parallel to the hub axis 46. Bolts 86 extending through the end adapter holes 56 fix the disc pack 28 to the end adapter 34, as described below. Preferably, when assembled, the end adapter holes 56 circumferentially alternate with the hub holes 52 and are equidistantly spaced from the hub axis 46 to simplify balancing the hub assembly 22. Of course, the holes 52, 56 can be randomly spaced from the hub axis 46 without departing from the scope of the invention.

A plurality of circumferentially spaced, axially extending end adapter threaded assembly holes 60 are formed through the end adapter 34 radially inwardly from the end adapter holes 56. Screws 62 extending through the end adapter 34 threadably engage axially extending threaded holes 64 formed in the center member 26. The screws 62 rigidly fix the end adapter 34 to the center member 26. Of course, other methods can be used to fix the center member 26 relative to the end adapter 34, such as welding, forming the end adapter 34 and center member 26 as one piece, and the like. Moreover, mechanical fasteners other than screws, such as bolts, clips, interlocking structures, and the like, can also be used to fix the center element relative to the end adapter without departing from the scope of the invention.

The disc pack 28 encircles the center member 26 between the hub flanges 32 of the hub assemblies 22, 24, and resiliently couples the end adapter 34 to the hub flange 32 to allow misalignment of the coupled shafts 16, 18. Advantageously, encircling the center member 26 with the disc pack 28 inwardly of the hub flanges 32 of the hub assemblies 22, 24 exposes the disc pack 28 for visual inspection without disassembling the coupling 10 to the shafts 16, 18. Moreover, locating the disc pack 28 between the hub flanges 32 of the hub assemblies 22, 24 away from the shafts 16, 18 connected by the coupling 10 prevents the disc pack 28 from interfering with the coupling connections. In addition, the disc pack 28 contains the center member 26 in the event of center member failure.

Preferably the disc pack 28 is formed from the plurality of coaxial discs. The outermost discs of the disc pack 28 define an axially inwardly facing face 74 and an axially outwardly facing face 76. The inwardly facing face 74 of the disc pack 28 forming the first hub assembly 22 faces the inwardly facing face 74 of the disc pack 28 forming the second hub assembly 24. Most preferably, the disc pack 28 includes eight to twelve discs stamped from a sheet of stainless or carbon steel. However, any number of discs formed from any suitable material, such as metal, an elastomeric material, and the like, can be used without departing from the scope of the invention.

A plurality of circumferentially spaced disc pack holes 82 are formed through the disc pack 28, and extend substantially parallel to a disc axis substantially coaxial with the hub axes 46. The disc pack holes 82 are alternately aligned with the hub holes 52 and end adapter holes 56 for receiving the bolts 54, 86 extending therethrough to fix the disc pack to the hub flange 32 and end adapter 34.

The disc pack 28 is fixed to the hub flange 32 and end adapter 34 adjacent to the axially inwardly facing face 74 of the disc pack 28 using the bolts 54, 86 extending through the aligned holes 52, 82 or 56, 82 formed through the hub flange 32 or end adapter 34 and disc pack 28 to resiliently couple the hub flange 32 and end adapter 34. Each bolt 54, 86 includes a bolt head 92 formed at a proximal end 94 of a threaded bolt body 96. Preferably, the bolts 54, 86 are inserted from the outwardly facing faces 40, 66 of the hub flange 32 and end adapter 34 to simplify assembly.

The disc pack 28 is fixed to the hub flange 32 by inserting a distal end 98 of the bolt body 96 of one of the bolts 54 into the one of the hub holes 52 formed through the hub flange 32, and through a washer 100 aligned with the one of the holes 52. The bolt 54 is further inserted in a direction of bolt insertion through one of the holes 82 of the disc pack 28 and a washer 102 aligned with the one of the holes 82 of the disc pack 28. A nut 106 threadably engaging the bolt body 96 is tightened against the washer 102 to fix the disc pack 28 to the hub flange 32.

The disc pack 28 is fixed to the end adapter 34 by inserting the distal end 98 of the bolt body 96 of another bolt 86 through one of the end adapter holes 56 formed through the end adapter 34, and through a washer 102 aligned with the one of the holes 56. The bolt 86 is further inserted through one of the holes 82 of the disc pack 28 and through a washer 100 aligned with the one of the holes 82 of the disc pack 28. A nut 106 threadably engaging the bolt body 96 tightened against the washer 102 to fix the disc pack 28 to the end adapter 34.

Inserting all of the bolts 54, 86 through the disc pack holes 84 in the same direction is preferred because the nuts 106 are then exposed over the center member 26 to simplify assembly and disassembly. Advantageously, by inserting the bolts 54, 86 from the same side of the hub flange 32 and end adapter 34, the drilling and tapping operations on the hub flange 32 and end adapter 34 can take place from the same side to minimize fabrication costs. Of course, the bolts 54, 86 can be inserted through the disc pack holes 84 from opposite sides of the disc pack 28 without departing from the scope of the invention.

The washers 100, 102 establish a gap or space 80 between the disc pack 28 and end adapter 34 and the disc pack 28 and hub flange 32. The space 80 provides physical clearance for the disc pack 28 to flex without making physically restricting contact with the end adapter 34 or hub flange 32. Preferably, the washers 100, 102 are alternately arranged with at least two different thicknesses, such that one washer 100 spaces the disc pack 28 from the hub flange 32 and the other washer 102 spaces the disc pack 28 from the end adapter 34 to space the disc pack 28 from the end adapter 34 and hub flange 32 different distances. Advantageously, the two different thickness washers 100, 102 arranged in an alternating fashion "open up" the space 80 between the end adapter 34 and hub flange 32 to allow disc pack 28 flexing. This physical built-in space 80 allows axial compression and angular deflection of the disc pack 28. In addition, the space 80 allows compression of the disc pack 28 for installation between the end adapter 34 and hub flange 32, without component interference.

The disc pack 28 can be spaced from the end adapter 34 and hub flange 32 different distances to "open up" the space 80 between the end adapter 34 and hub flange 32 and allow disc pack 28 flexing using other methods without departing from the scope of the invention. For example, the disc pack 28 can be spaced from the end adapter 34 and hub flange 32 by providing a spacer, such as washer, between the disc pack 28 and only one of the end adapter 34 and hub flange 32. The spacer has a thickness which spaces the disc pack 28 from both the end adapter 34 and hub flange 32 while allowing the disc pack 28 to flex without making physically restricting contact with either of the end adapter 34 or hub flange 32 under normal conditions.

In use, the disc packs 28 are slipped around the center member 26 and the end adapters 34 are fixed to the center member 26 to capture the disc packs 28 therebetween encircling the center member 26. Each hub flange 32 is then fixed to one of the shaft ends 12, 14 and each end adapter is nested in the cavity 50 of one of the hub flanges 32. Once the coupling 10 is fixed to the shaft ends via the hub flanges 32, each disc pack 28 is fixed to both the hub flange 32 and end adapter 34 of one of the hub assemblies 22, 24 to resiliently couple the hub flange 32 to the end adapter 34.

The coupling 10 is balanced either prior to, or after, being mounting on the shaft ends by axially compressing each disc pack 28 using tools, such as a C-clamp, and then radially inserting a pin, or other object, such as a screw, in the space 80 between the disc pack 28 and end adapter 34 and hub flange 32, to hold the disc pack 28 in the compressed state and fix the center member 26 in a fixed axial position. The coupling 10 is then dynamically balanced in a balancing machine by rolling on the cylindrical outer diameter of the hub assemblies. This particular balancing method reduces balancing errors by minimizing the need for excessive balance tooling, often referred to as "parasitic mass." Of course, other methods for balancing the coupling 10 can be used, such as attaching sufficient "parasitic mass" to overcome the instability of a non-fixed center element can be used without departing from the scope of the invention.

Figure 3:
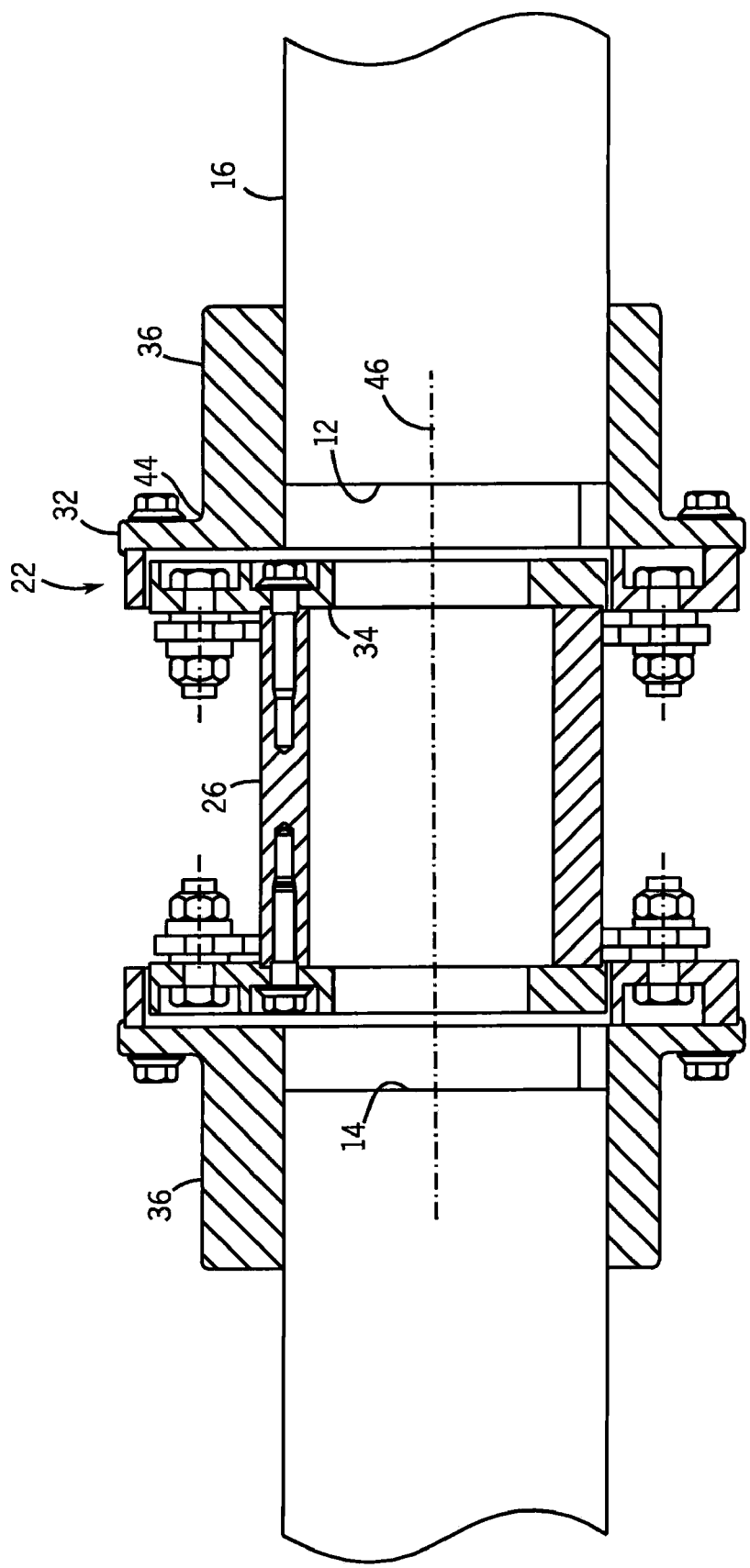
FIG. 3 is a sectional view of another coupling incorporating the present invention.

In another embodiment of the present invention shown in FIG. 3, the hub assembly 22 includes a cylindrical body 36 having the radially extending hub flange 32 formed at one end 44, and is rotatable about the hub axis 46. The body 36 is rotatably fixed to the shaft end 12 of the shaft 16 substantially coaxially with the shaft 16 using methods known in the art, such as welding, mechanical fasteners, keys, threads, and the like, for transmitting torque between the hub assembly 22 and shaft 16.

In the embodiment disclosed in FIG. 3, the hub flange 32 extends radially from the hub body 36 as a single piece. Preferably, the hub flange 32 and body 36 are formed from a single machined metal casting, such as steel. However, the hub flange 32 can be formed as a separate piece and fixed to the body 36 using other methods known in the art, such as mechanical fasteners, welding, and the like. Installation of this embodiment requires fixing the hub bodies 36 onto the shaft ends 12, 14 prior to fixing both the hub flanges 32 onto the center member 26.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

I claim:

1. A disc pack coupling for transmitting torque between two shafts approximately aligned on a shaft axis, said coupling comprising:
   a first hub assembly including a first end adapter adjacent to a first hub flange;
   a center member having first and second opposing ends, said first end being fixed to said first end adapter; and
   a first disc pack encircling said center member and resiliently coupling said first end adapter and said first hub flange,
   wherein one of said hub flange and said end adapter is sandwiched between said first disc pack and the other of said hub flange and said end adapter; wherein one of said first end adapter and said first hub flange is received in a cavity formed in the other of said first end adapter and said first hub flange; wherein said one of said first end adapter and said first hub flange received in said cavity includes a non-circular perimeter engageable with said cavity to maintain torque transmission upon failure of said first disc pack.

2. The coupling as in claim 1, including a second hub assembly including a second end adapter loosely coupled with a second hub flange, said second end of said center member being fixed to said second end adapter, and a second disc pack encircling said center member and resiliently coupling said second end adapter and said second hub flange.

3. The coupling as in claim 1, in which said first hub flange is fixed to a hub body.

4. The coupling as in claim 1, in which said one of said first end adapter and said first hub flange is nested in the other of said first end adapter and said first hub flange.

5. The coupling as in claim 1, in which said first end of said center element is fixed to said first end adapter using a procedure selected from a group consisting of mechanical fastening using mechanical fasteners, welding, and casting.

6. The coupling as in claim 1, in which said first disc pack is spaced from said hub flange by a first washer and from said end adapter by a second washer; wherein the first and second washer have different thicknesses.

7. A disc pack coupling for transmitting torque between two shafts approximately aligned on a shaft axis, said coupling comprising:
a first hub assembly including a first end adapter adjacent to a first hub flange;
a center member having first and second opposing ends, said first end being fixed to said first end adapter; and
a first disc pack resiliently coupling said first end adapter and said first hub flange, wherein one of said hub flange and said end adapter is sandwiched between said first disc pack and the other of said hub flange and said end adapter, and said first disc pack being spaced from said hub flange by a first washer and from said end adapter by a second washer;
wherein the first and second washers have different thicknesses; wherein one of said first end adapter and said first hub flange is received in a cavity formed in the other of said first end adapter and said first hub flange: wherein said one of said first end adapter and said first hub flange received in said cavity includes a non-circular perimeter engageable with said cavity to maintain torque transmission upon failure of said disc pack.

8. The coupling as in claim 7, including a second hub assembly including a second end adapter loosely coupled with a second hub flange, said second end of said center member being fixed to said second end adapter, and a second disc pack encircling said center member and resiliently coupling said second end adapter and said second hub flange.

9. The coupling as in claim 7, in which said first hub flange is fixed to a hub body.

10. The coupling as in claim 7, in which said one of said first end adapter and said first hub flange is nested in the other of said first end adapter and said first hub flange.

11. The coupling as in claim 7, in which said first end of said center element is fixed to said first end adapter using a procedure selected from a group consisting of mechanical fastening using mechanical fasteners, welding, and casting.

12. The coupling as in claim 7, in which one of said hub flange and said end adapter is sandwiched between said first disc pack and the other of said hub flange and said end adapter.

13. The coupling as in claim 7, in which said disc pack includes an axially outwardly facing face and an axially inwardly facing face, and said first end adapter and said first hub flange are disposed adjacent said outwardly facing face.

14. The coupling as in claim 7, in which said disc pack encircles said center member.

15. A disc pack coupling for transmitting torque between two shafts approximately aligned on a shaft axis, said coupling comprising:
a first hub assembly including a first end adapter adjacent to a first hub flange, one of said first end adapter and said first hub flange being received in a cavity formed in the other of said first end adapter and said first hub flange;
a center member having first and second opposing ends, said first end being fixed to said first end adapter; and
a first disc pack resiliently coupling said first end adapter and said first hub flange, wherein one of said hub flange and said end adapter is sandwiched between said first disc pack and the other of said hub flange and said end adapter, and said first disc pack being spaced from said hub flange and said end adapter by at least one first washer having a thickness and interposed between said first disc pack and one of said hub flange and said end adapter;
wherein at least one of said first end adapter and said first hub flange has a non-circular perimeter substantially coaxial with the shaft axis and engageable with said cavity.

16. The coupling as in claim 15, in which said non-circular perimeter engages said cavity to maintain torque transmission upon failure of said disc pack.

17. The coupling as in claim 15, in which at least one second washer having a thickness different from said thickness of said first washer is interposed between said first disc pack and the other of said hub flange and said end adapter.

18. The coupling as in claim 15, in which said disc pack encircles said center member.

* * * * *